United States Patent [19]

Shigenobu

[11] 4,161,884
[45] Jul. 24, 1979

[54] TURN RATE INDICATOR OF AIRCRAFT USING GYROSCOPE

[75] Inventor: Kouhei Shigenobu, Komae, Japan

[73] Assignees: Tokyo Aircraft Instrument Co., Ltd., Tokyo, Japan

[21] Appl. No.: 894,151

[22] Filed: Apr. 6, 1978

[30] Foreign Application Priority Data

Feb. 28, 1978 [JP] Japan .................................. 53-22542

[51] Int. Cl.² ............................................. G01P 9/02
[52] U.S. Cl. ..................................... 73/504; 74/5.47
[58] Field of Search ............................. 73/504; 74/5.7

[56] References Cited
U.S. PATENT DOCUMENTS

| | | | |
|---|---|---|---|
| 2,737,815 | 3/1956 | Wikkenhauser | 74/5.7 |
| 2,963,912 | 12/1960 | Kawarada | 74/5.7 |
| 3,240,076 | 3/1966 | Li | 74/5.7 |
| 3,753,374 | 8/1973 | Strassburg | 74/5.7 |

Primary Examiner—James J. Gill
Attorney, Agent, or Firm—Spencer & Kaye Kaye

[57] ABSTRACT

A turn rate indicator of an aircraft wherein the outer rotor of a Hall motor is used as a gyro rotor. A driving circuit for the gyro stator circuit is provided integrally with the gyro gimbal. The driving circuit is coupled to a connector affixed to the case of the turn rate indicator with fine connecting lines keeping a slack section between the driving circuit and the connector.

4 Claims, 5 Drawing Figures

TURN RATE INDICATOR OF AIRCRAFT USING GYROSCOPE

This invention relates to a turn rate indicator for an aircraft which employs a gyroscope to measure and indicate the angular velocity rate caused by turning of the aircraft.

Known turn rate indicators include turn coordinators, turn-and-slip indicators and turn-and-bank indicators. In most of these apparatuses, gyroscopes are used, and when the aircraft is not changing its position, the spin axes of these gyroscopes are kept parallel to the pitch axis of the aircraft. In order to rotate the gyroscopes with high speed, D.C. or A.C. motors are used.

The D.C. motor, which is suppled with an external D.C. power source for rotation of its rotor, is useful because of the simplicity of its power source and means of connection.

However, the use of such conventional D.C. motors in the turn rate indicators of aircraft where high instruments reliability is required is disadvantageous because the conventional D.C. motor possesses an inherent problem due to its use of a commutator.

Carbon rods which are used as brushes for the commutator of a D.C. motor are easily worn by abrasion and therefore require periodic inspection and exchange. This is not easy, and is particlularly cumbersome when the D.C. motor is used as an aircraft instrument because the entire instrument must be taken apart and re-assembled to inspect the brushes.

Further, when a commutator is used, radio noises are more or less generated. Therefore when a D.C. motor having a commutator is used as an aircraft instrument, the commutator noise may interfere with operation of other electronic equipment located in the aircraft.

Recently, a Hall effect D.C. motor which does not require a commutator has been developed and used in specific technical fields. This motor employs Hall elements to switch the currents running through the coils of the motor.

The Hall element or generator is a semi-conductor element which changes the polarity of the output voltage it generates in accordance with the direction of the flux. In the Hall effect D.C. motor (hereinafter referred to as Hall motor), this Hall element is fixed to the side of the stator. Thus, the current through the stator coils is switched by the electromotive force generated by the rotor flux so as to continue rotation of the rotor. The Hall motor is used in conjunction with a control circuit for switching the current supplied to the stator coils by a signal from the Hall elements. The control circuit, the stator coils and the Hall elements are electrically connected by many connecting lines.

When such a Hall motor is used to constitute a gyroscope, the connecting lines or circuits, can affect the dynamic characteristics of the gyroscope.

Accordingly, it is an object of the present invention to solve the above problem and to provide a turn rate indicator using a Hall motor without impairing the dynamic characteristics of the gyroscope itself.

To fulfil this object, the turn rate indicator of this invention includes a gyroscope having freedom of rotation around at least one axis. This invention comprises a housing including an annular member adapted to be fixed to an aircraft body; a gimbal rotatable with respect to the annular member, which is returnable to a reference position; a motor stator having an electric circuit provided with coils and Hall elements whose central axle is supported by the gimbal and, when the aircraft is not turning, is parallel to the pitch axis of the aircraft; an outer motor rotor rotatably supported by the central axle of the motor stator at an outer periphery of the motor stator; a Hall motor control circuit device integrally supported by the gimbal and the motor stator, which controls current applied to the coils by signals from the Hall elements; a plural connecting lines which connect the electric circuit of the Hall motor stator and the control circuit device; power supply lines connecting the control circuit device and a power source terminal in the side of the body and a pointer driven by the gimbal according to the angular displacement of the gimbal with respect to the annular member.

According to the construction above-mentioned, the plural connecting lines connecting the Hall motor stator and the control circuit device are provided at the gimbal side, and do not interrupt the angular displacement of the gimbal with respect to the housing. Thus, the Hall motor rotor can be used as a gyro rotor without adversely affecting the dynamic characteristics of the gyroscope, and the problems which exist when conventional D.C. motors are used as mentioned above can be completely solved.

The invention and its objects and advantages will become more apparent from the detailed description of the preferred embodiment presented below. In the detailed description, reference is made to the accompanying drawings, in which.

Figure 1:
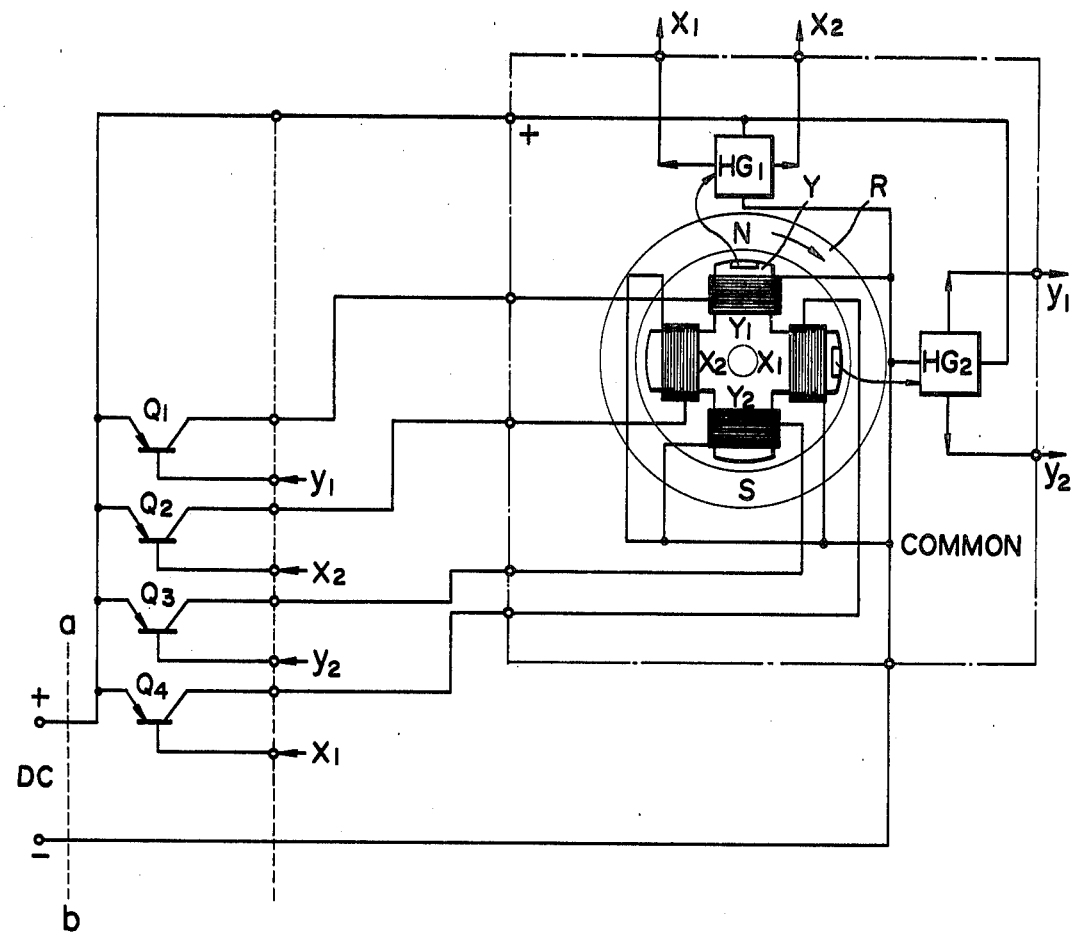
FIG. 1 is a circuit diagram illustrative of the principle of the typical Hall effect D.C. motor.
Figure 2:
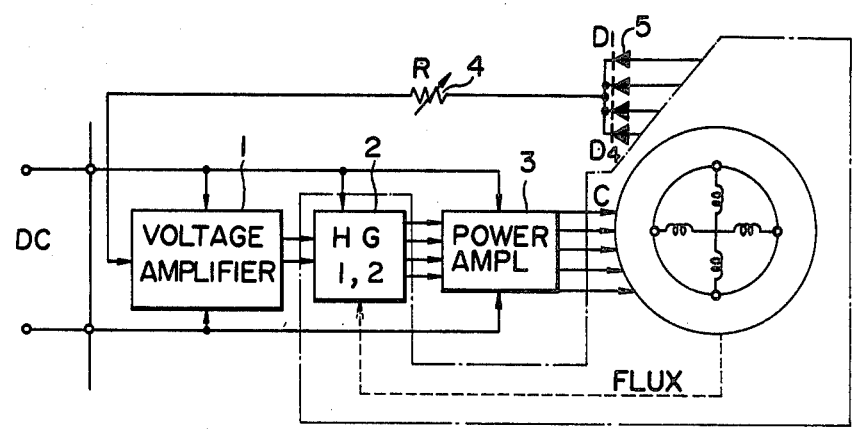
FIG. 2 is a block diagram of a Hall motor control circuit used in the apparatus of this invention.

The operation of a Hall motor used in the aircraft turn rate indicator of of the present invention is explained hereunder with reference to FIGS. 1 and 2.

The stator is of the four pole type, the respective poles being shown in FIG. 1 as the $Y_1$, $Y_2$, $X_1$ and $X_2$ poles. On each of these four poles is wound a coil having one end combined with an end of the other coils and connected to a negative power source terminal. The other end of the coil of the $Y_1$ pole is connected to the collector of a transistor $Q_1$, and similarly the other ends of the $X_2$, $Y_2$, and $X_1$ poles are respectively connected to the collector electrodes of transistors, $Q_2$, $Q_3$ and $Q_4$.

At the tops of the $Y_1$ pole and the $X_1$ pole the $X_1$ pole being 90 degree apart from the $Y_1$ pole are provided respectively Hall elements $HG_1$ and $HG_2$ which are connected to the power source. The output terminals $x_1$ and $x_2$ of the Hall element $HG_1$ and the output terminals $y_1$ and $y_2$ of Hall element $HG_2$ are connected respectively to the base electrodes of the transistors $Q_4$, $Q_2$, $Q_1$ and $Q_3$.

In order to rotate a rotor R in the clockwise direction in the figure, a rotative magnetic field in the clockwise direction must be generated by each coil of the stator.

When an N pole of the rotor R is at the position of the stator $Y_1$ pole, the Hall element $HG_1$ generates a voltage at the terminal $x_1$. The electromotive force at terminal $X_1$ causes transistor $Q_4$ to conduct and as a result the $X_1$ pole is energized and becomes an S pole. Accordingly, the N pole of the rotor R is attracted thereto and rotates itself through 90 degree in the direction shown in the figure by an arrow, and the magnetic field acting on the element $HG_1$ reaches a neutral or zero point where the output therefrom becomes zero. At this stage, the element $HG_2$ opposes the N pole of the rotor R so as to generate a voltage in the direction of the terminal $y_2$. Thus, the stator $Y_2$ pole is energized through the transistor $Q_3$ to rotate the rotor R through an additional 90 degrees. Since the element $HG_1$, now faces an S pole of the rotor R, a voltage is generated at the terminal $x_2$. Accordingly, the transistor $Q_2$ conducts and the $X_2$ pole of the stator is energized to become an S pole. The $Y_1$ pole and the $X_1$ pole are successively energized to rotate the rotor R.

FIG. 2 shows a block diagram of the entire Hall motor driving circuit. Several additional circuits are provided for driving the Hall motor other than the circuit shown in FIG. 1.

In order to regulate the speed of the rotation of the motor and to rotate the motor at a constant regulated speed of, the counter electromotive force generated in the motor coils is utilized. This counter electromotive force is generated in proportion to the speed of revolution the motor.

The voltage is applied to a voltage amplifier 1 through diodes $D_1$, $D_2$, $D_3$ and $D_4$ connected to the respective coils and a variable resistor 4 is used for speed regulation.

The voltage amplifier 1 amplifies a voltage component rectified by the diodes which is in proportion to the motor revolution speed. Amplifier 1 supplies a Hall element circuit 2 containing Hall elements $HG_1$ and $HG_2$ with a signal for regulating the sensitivity of the circuit 2 and then the degree of power amplifier 3 with a signal for regulating a power amplification. This power amplifier 3 includes power transistors corresponding to the transistors $Q_1$, $Q_2$, $Q_3$ and $Q_4$ shown in FIG. 1. The output terminals of the Hall element circuit 2 are connected to control input terminals of the power transistors. The amplified current from the amplifier 3 is supplied to stator coils of the Hall motor.

Since the Hall element circuit 2 is under the influence of the Hall motor rotor permanent magnet of, it operates the transistors successively as explained in relation to FIG. 1. In this circuit, a negative feedback loop is formed and when the counter electromotive force increases, the motor speed is lowered by reducing the sensitivity of the Hall elements $HG_1$ and $HG_2$ and also the power amplification. In the reverse case, the motor speed is raised. Thus the revolution speed of the motor is maintained at a constant rate.

In the above-mentioned motor driving system, it should be noted that the Hall elements $HG_1$ and $HG_2$ must be mounted on the side of the motor. For connection of other circuit elements and the motor, more than ten connecting lines are necessary.

Figure 3:
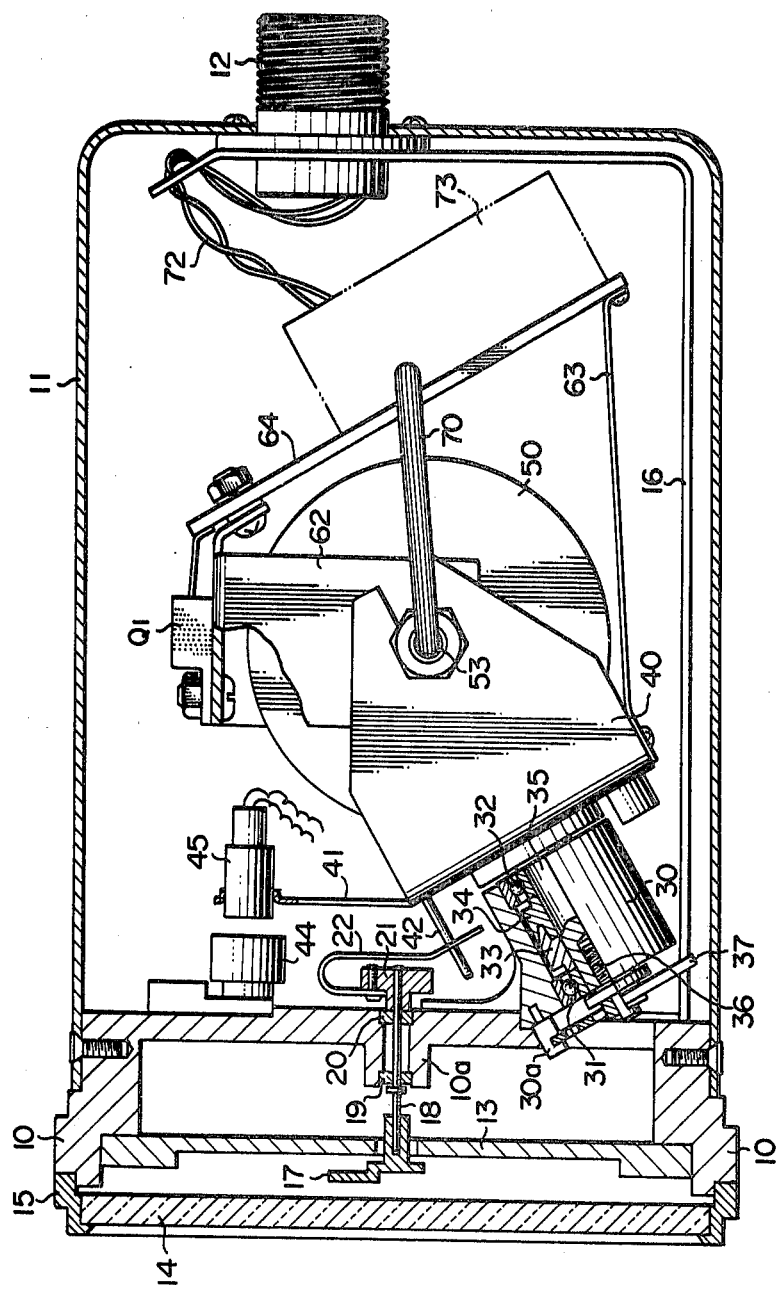
FIG. 3 is a side view, partly broken, of an embodiment of the turn rate indicator of an aircraft according to the present invention.

FIG. 3 shows an embodiment of the aircraft turn rate indicator according to the present invention which includes a Hall motor having the above-mentioned control circuit. In order to show the inner construction thereof, a part of a housing of the indicator is shown broken away. In this embodiment, an axis of a gimbal 40 is tilted at 30° with respect to the roll axis of the body of the aircraft. The spin axis of a rotor 50 is maintained parallel to the pitch axis of the aircraft body.

An annular member 10 is formed of a casting consisting mainly of aluminium and is provided at its center 10a with an opening for passing a pointer shaft 18 therethrough. To the member 10 is fixed a gimbal bearing sleeve 30 for supporting a gimbal shaft 35.

The gimbal bearing sleeve 30 is provided with a pair of roller bearings 31 and 32 and the gimbal shaft 35 is rotatably supported by these bearings. The numerals 33 and 34 denote rings for providing adequate damping force between the gimbal shaft 35 and the bearing sleeve 30, and a suitable damping liquid fills the space between the sleeve 30 and the rings 33 and 34. Between the lower end of the gimbal shaft 35 and a shaft 30a provided on the gimbal bearing sleeve 30 is provided a hair spring 37 spring 37 supports the gimbal shaft 35 so that the spin axis of the rotor 50 is kept parallel to the pitch axis of the aircraft body and balances, by its spring effect, any force in the tilting direction of the spin axis caused by an external force produced when the aircraft is turning about its axis.

To the gimbal shaft 35 is fixed a gimbal 40 having both ends bent up at right angle respectively. To each of the bent up ends of the gimbal is provided the slit for supporting a stator axle of the Hall motor, as will be explained hereinafter.

A control circuit element supporting means 62 which acts together with the gimbal 40 as a radiator frame or fin is fixed in an upper part of the apparatus.

Figure 4:
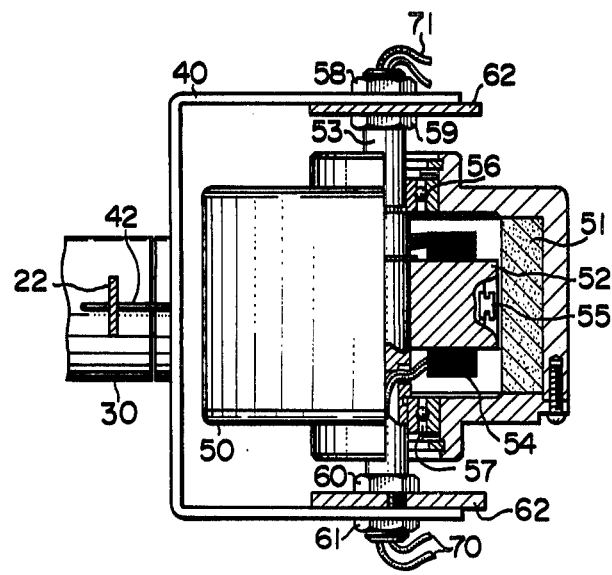
FIG. 4 shows a rotor seen in the direction a at right angle to the gimbal shaft.

The relation between the gimbal 40 and the Hall motor is best explained with reference to FIG. 4, which shows the indicator seen from above at a right angle to the gimbal rotation axis.

The central axle 53 of the Hall motor stator is provided at its two ends with screw threads, by which the gimbal 40, the radiator frames 62 and the central axle 53 are fixed by way of nuts 58, 59, 60 and 61. Both ends of the central axle 53 are provided with a hole opening toward the outside through which connecting lines 70 and 71 are inserted and connected to a motor stator coil 54, a Hall element 55, etc. In the figure, the numeral 52 denotes one pole of the stator. To an inner wall of the rotor 50 of the Hall motor is provided a cylindrical magnet 51, which is magnetized as already explained with reference to FIG. 1. The rotor 50 is rotatably supported by ball bearings 56 and 57. A printed circuit board 64 of FIG. 3 holding circuit elements other than the power transistors is fixed to the radiator frame 62 and is further connected to the gimbal 40 through a support frame 63. The connecting lines connected to the circuit elements in the Hall motor stator are connected to the printed circuit board. In such case they are arranged to be separated into two groups of almost the same volume.

The power transistors corresponding to the transistors $Q_1$, $Q_2$, $Q_3$ and $Q_4$ which are connected to the stator coils as explained in relation to FIG. 1, are mounted on the radiator frame 62 in a line and are thermally coupled to the frame. The electrodes of the transistors are directly soldered to the printed circuit board 64.

Connecting lines 72 for supplying the printed circuit board 64 from a D.C. power source are connected with a slack section between a connector 12 and the printed circuit board 64. Since the connecting lines 72 swing according to the angular change around the gimbal axis, they have sufficient flexibility by themselves. The connector 12 is fixed to a case 11 having a cup shape and which is fixed to the annular member 10 and to a main frame 16 which is also fixed to the member 10. The member 10 and case 11 comprise the housing of the indicator. This connector 12 may be used for connection to external elements other than the power source lines for the Hall motor.

The gimbal 40 is provided with a transmission pin 42 and an arm 41, the transmission pin 42 transmitting rotation of the gimbal 40.

In front of the member 10 there is provided a panel plate 13 and in front of the panel plate 13 a pointer 17 is fixed to a pointer shaft 18. The shaft 18 is rotatably received in the member 10 by bearings 19 and 20, and to the other end thereof is fixed a pointer wheel 21 to which a fork spring 22 is fixed. The top end of spring 22 has a fork shape. The fork shaped end of fork spring 22 is connected to the transmission pin 42 which transmits rotation of the gimbal 40 to the pointer 17. In front of the pointer 17 is provided a window glass 14, which is fixed to the member 10 by a fixing means 15.

Figure 5:
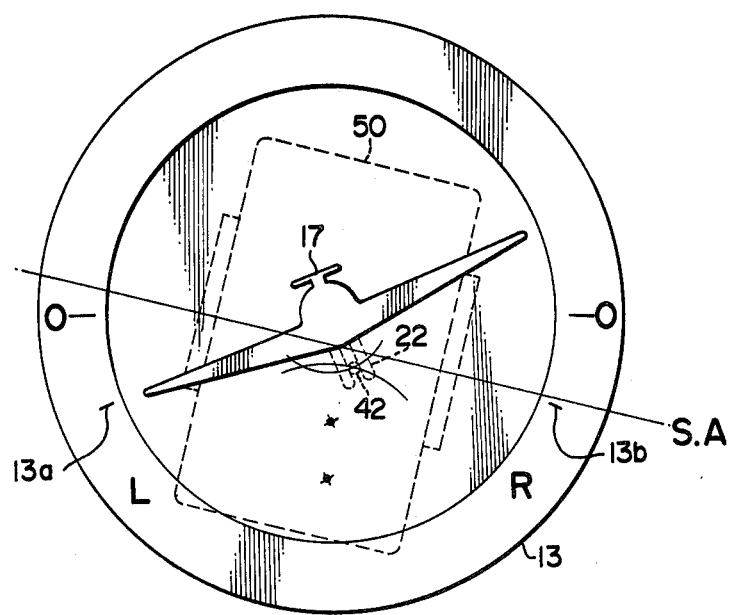
FIG. 5 is a view seen from forward of a panel of the aircraft turn rate indicator according to the present invention.

FIG. 5 shows the indicator of this invention as seen from the front of the member 10. In the figure, an index 13a shows the corresponding to a left turn of 180°/minute and an index 13b shows a position corresponding to a right turn of 180°/minute. The relation shown in this figure is of the pointer 17, the fork spring 22 and the rotor 50 when the aircraft is turning left.

A source lamp 45 fixed to the arm 41 rotates according to rotation of the gimbal 40. Facing to the source lamp 45 there is provided a photoelectric element 44, which generates an electrical output corresponding to the turn rate of the aircraft. That is as the photoelectric element 44, which may comprise a photoconductive element such as CdS, generates an electric output which is proportional to the angular displacement between the photoelectric element 44 and the lamp 45. This photoelectric element 44 may be dispensed with if the indicator is designed to indicate the turn rate only by means of the pointer 17.

In the space between the member 10 and the panel plate 13, several accessory indicator elements may be mounted. For example, when the turn device is a turn-coordinator, a level may be mounted in the lower space and an indication may be given in the front portion as an inclinometer.

The upper space may be utilized for mounting therein a failure indicator to indicate that the instruments are not in operation or are in operation. Switching of the failure indicator on and off may be controlled by the counter electromotive force generated in a stator coil of the Hall motor.

As explained above, the connecting lines of the Hall motor control circuit are drawn out in a balanced configuration with respect to the spin axis and connected to the control circuit. Therefore these plural connecting lines do not interrupt the free rotation of the gimbal 40. Thus motional balance between these elements well maintained.

In the indicator of this invention the control circuit is as above mentioned designed to rotate together with the gimbal. The power source lines are the only interrupting element which can produce friction or rotation around the gimbal shaft. This is almost same as the case of the conventional D.C. motor gyroscopes using a commutator therein.

Durability of the motor has been much improved by use of the Hall motor and several problems inherent in the conventional D.C. motor gyroscopes caused by their brushes have been completely solved.

Further, the matter of radiation of the power transistors for controlling the Hall motor has been fully solved by using the circuit support member 62 integrally fixed to the gimbal as a radiator frame or fin.

The invention has been described in detail with particular reference to a preferred embodiment thereof, but it will be understood that variations and modifications can be effected within the spirit and scope of the invention.

What I claim is:

1. An aircraft turn rate indicator including a gyroscope having freedom of rotation around at least one axis, comprising:
   a housing including an annular member adapted to be secured to the body of said aircraft;
   a gimbal mounted within said housing and rotatable with respect to said annular member, said gimbal being returnable to a reference position;
   a motor stator having a central axle supported by said gimbal, said stator including a plurality of coils and Hall elements, the central axle of said motor stator being parallel to the pitch axis of said aircraft when said aircraft is not turning;
   an outer motor rotor rotatably supported by the central axle of said motor stator at the outer periphery of said stator;
   a Hall motor control circuit integrally supported by said gimbal, said control circuit including a plurality of semiconductor devices each thermally coupled to said gimbal and electrically connected to corresponding coils and Hall elements of said motor stator, said semiconductor devices controlling the current through said stator coils in response to signals from said Hall elements;
   a plurality of connecting lines for electrically connecting the coils and Hall elements of said stator to said control circuit;
   power supply lines for connecting said control circuit to a power source terminal integrally mounted to said housing; and
   a pointer driven by said gimbal in accordance with the angular displacement of said gimbal with respect to said annular member.

2. An aircraft turn rate indicator as defined by claim 1 wherein said plurality of connecting lines are separated into two substantially equal parts.

3. An aircraft turn rate indicator as defined by claim 1 wherein said power supply lines are provided with a slack section between said control circuit and said power source terminal.

4. An aircraft turn rate indicator as defined by claim 1 which further comprises
   a radiator frame secured to the central axle of said motor stator and in thermal contact with said gimbal, said semiconductor devices being attached to said radiator frame, and
   a printed circuit board for supporting elements of said control circuit other than said semiconductor devices attached to said gimbal and said radiator frame.

* * * * *